April 29, 1958      B. M. EDSALL      2,832,231

ACCUMULATOR CONTROLS FOR AUTOMATIC TRANSMISSION

Filed May 14, 1956      2 Sheets-Sheet 2

INVENTOR.
Bruce M. Edsall
BY
W. C. Middleton
ATTORNEY

United States Patent Office 2,832,231
Patented Apr. 29, 1958

2,832,231

ACCUMULATOR CONTROLS FOR AUTOMATIC TRANSMISSION

Bruce M. Edsall, Oak Park, Mich., assignor to General Motors Corporation, Detroit, Mich., a corporation of Delaware Application May 14, 1956, Serial No. 584,725

8 Claims. (Cl. 74—472)

This invention relates to accumulator controls for controlled coupling transmissions and more particularly to such controls for transmissions of that type employing a pair of planetary gear units, both energized for forward drive and having a fluid coupling functionally interposed between the units.

The present transmission is an improvement over that illustrated and described in the copending applications of Walter B. Herndon, Serial No. 393,698, filed November 23, 1953, for Controlled Coupling Multi-Step Automatic Transmissions, and August H. Borman, Jr., et al., Serial No. 477,832 filed December 27, 1954, for Controlled Coupling Automatic Transmissions.

In transmissions of the type shown in the Herndon and Borman, Jr., et al. applications and of the type incorporated in the present invention, the two planetary gear units can be conditioned respectively for reduction and direct drive, with the conditioning of the two units so coordinated as to provide four forward speed ratios. In addition, the transmission incorporates a third planetary gear unit which can be conditioned to provide reverse drive when the two forward planetary units are concurrently properly conditioned. The change in speed ratio is automatically obtained by the proper conditioning of the gear units through their friction engaging elements such as brakes and clutches, so that under normal driving conditions the transmission will automatically advance from first speed ratio to fourth speed ratio.

The present invention relates particularly to controls for accumulators which are associated with friction engaging devices such as clutches. These accumulators serve to cushion and to time the application of a friction engaging device by acting as a reservoir receiving the oil supply in parallel relation to the friction engaging device. The reservoir amounts to a cylinder with a spring biased piston therein with the oil in parallel to the friction engaging device being introduced into the cylinder to raise the piston against spring pressure. In order that the timing of the application of the clutch can be varied, the present invention makes use of throttle valve pressure which varies with throttle opening to augment the force exerted by the spring. Thus, under high torque demand such as with a full throttle opening, the piston in the reservoir is biased both by the spring and by high throttle valve pressure to resist motion thereof due to the oil pressure supplied both to the piston and to the friction engaging device so that this pressure attains its maximum very quickly causing a rapid application of the friction engaging device. If the torque demand is low, i. e., the throttle is only partially opened, the resistance encountered by the oil acting on the piston in the accumulator is lower so that this piston is moved against the spring and lower throttle valve pressure, thereby delaying the build up of maximum pressure to engage the friction engaging device.

An object of this invention is to provide a control for an accumulator as just described in which the throttle valve pressure applied thereto is prevented from reaching the maximum developed pressure.

Another object of the invention is to provide a trimmer valve in the supply line of throttle valve pressure to the accumulator which valve operates to limit the throttle valve pressure applied to the accumulator to a pressure which is lower than the maximum throttle valve pressure.

A still further object of the invention is to provide a trimmer valve which operates to permit true throttle valve pressure to pass to the accumulator over an initial stage of throttle valve pressure increase and thereafter modulates throttle valve pressure in direct proportion to the increase thereof.

The mechanism and hydraulic arrangements whereby the foregoing objects, and other objects of the invention, can be attained will be evident from the detailed description of an embodiment of the transmission, which embodiment is illustrated in the accompanying drawings, wherein.

Figure 1:
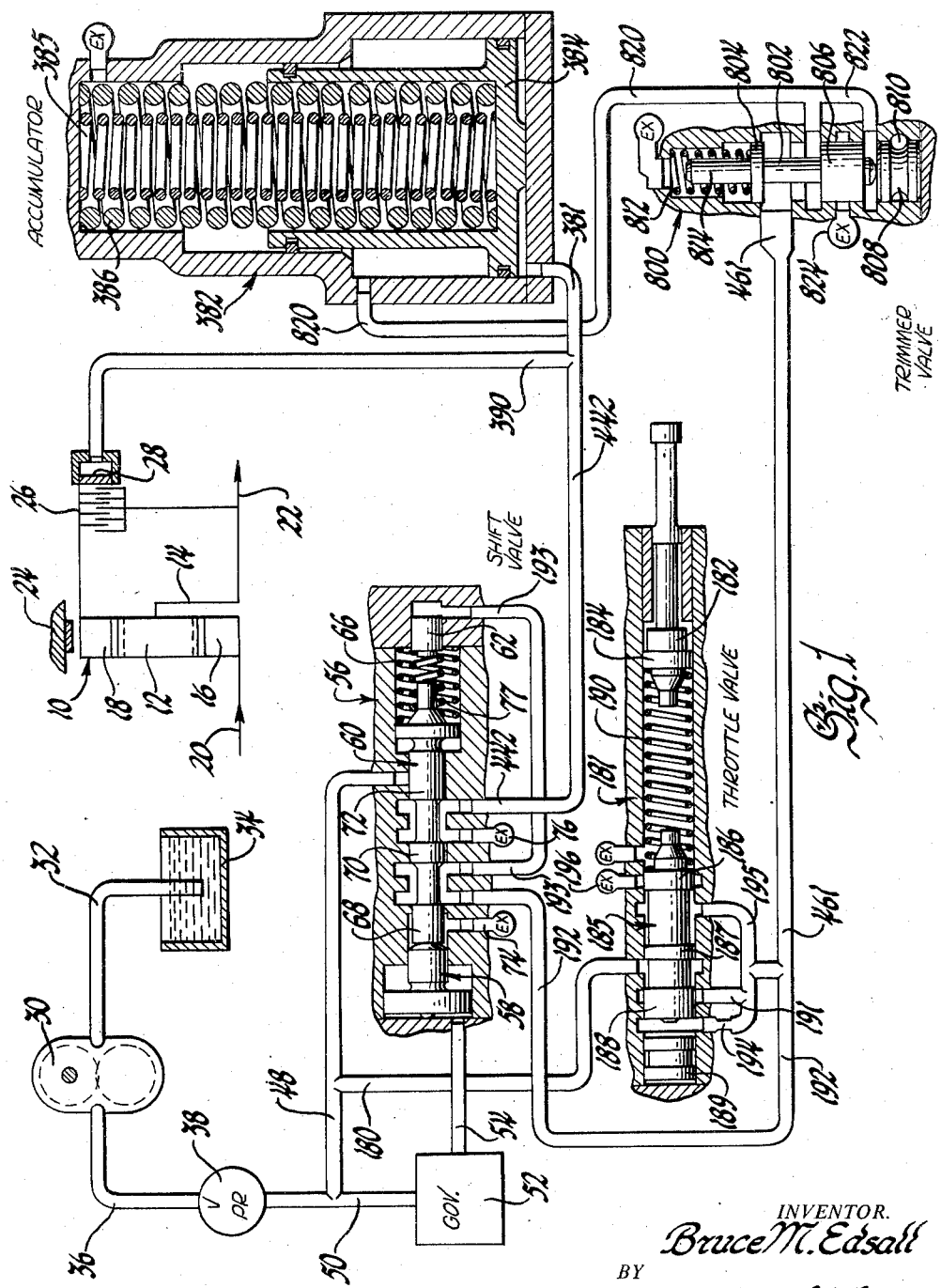
Figure 1 is a schematic illustratoin of the hydraulic circuits for operating the gearing.

Referring to Figure 1, a planetary gear set 10 of the conventional type for furnishing reduction and direct drives is illustrated. The gear set 10 comprises a plurality of planet pinions 12 journaled on a carrier 14 and intermeshing with an input sun gear 16 and a reaction ring gear 18. A driving shaft 20 may be interconnected between the sun gear 16 and a suitable source of power, such as a prime mover (not shown), while the carrier 14 may be connected to an output or driven shaft 22. The driven shaft 22 is drive related to vehicle wheels in a known manner. When a reduced drive ratio is desired, i. e., with the driving shaft 20 rotating faster than the driven shaft 22, a brake band 24 or equivalent may be actuated to restrain rotation of the ring gear 18, hence providing the reduced drive ratio. If a direct drive is desired, then a clutch 26 interposed between the driven shaft 22 and the ring gear 18 is utilized to prevent relative motion therebetween, thus locking up the planetary gear set 10 for unitary drive. The clutch 26 is preferably of the multi-disc kind with a piston 28 hydraulically operated to compress the discs and engage the clutch.

To supply pressure fluid for operating the piston 28 of the clutch 26 a pump 30 is provided. Pump 30 has a suction line 32 in communication with a sump 34 and a discharge line 36 connected to the customary pressure regulator valve 38, the function being to maintain some predetermined pressure for the hydraulic system. From the pressure regulator valve 38, pressure fluid is furnished to the controls through a supply line 48. A branch line 50 from the supply line 48 delivers pressure fluid to a governor 52. The governor may be driven either at the speed of the drive shaft 20 or the driven shaft 22. However, in this instance, it is preferable that the governor be driven by the driven shaft 22 to develop a governor pressure proportional to the driven shaft speed for delivery through a line 54 to a shift valve 56. The governor 52 may be of the hydraulic type shown in the patent to Thompson 2,204,872.

Shift valve

Any suitable shift valve may be utilized to supply pressure fluid to the clutch 26 upon establishment of a predetermined relationship between governor pressure and throttle pressure, the latter being proportional to accelerator positions. The shift valve 56 depicted includes a governor plug valve 58, a shift valve member 60 and a regulator plug valve 62, all slidably disposed in an aligned bore of the valve body. The governor plug valve 58 abuts the adjacent end of the shift valve member 60 with both being moved to the right and the upshift position by governor pressure supplied by the line 54 against the opposition of a shift spring 66. With the shift valve member 60 in the position shown, spaced lands 68, 70 and 72 thereon are arranged so that land 68 both closes an exhaust 74 and coacts with land 70 to permit communication between lines 192 and 193 while lands 70 and 72 open line 442 to an exhaust 76 and land 72 cuts off supply line 48. Throttle pressure from a throttle valve 181 proceeds through line 193 to the end of the regulator plug valve 62 to add to the spring force opposing movement of the shift valve to the right and to the upshift position. A spring 77 is interposed between valve member 60 and regulator plug 62 to urge them apart.

When governor pressure is sufficient to overcome both the biasing force of the spring 66 and the counter force of throttle pressure acting on the plug valve 62, the governor plug valve 58 will move valve member 60 to the right. Then, pressure fluid from supply line 48 proceeds to line 442, thence line 390, to the piston 28 and commences engagement of the clutch 26.

Throttle valve

A branch line 180 from the main supply line 48 leads to the bore in the valve body which receives the throttle valve indicated generally at 181. This valve is made up of an accelerator pedal responsive member 182 having a land 184 and a metering part 185 having lands 186, 187 and 188. A spring 190 is interposed between the parts 182 and 185. One end of the bore is closed by a plug 189.

This throttle valve operates as a metering valve in a well-known fashion, that is, as the accelerator pedal or throttle of the vehicle is moved to increase the throttle opening of the carburetor, the part 182 is moved to the left as viewed in the drawings, compressing the spring 190 with resultant movement of the metering part 185 also to the left. When this occurs, the land 188 uncovers a port connected to the line 191, permitting oil from the branch main supply line 180 to enter this line 191 and proceed therefrom into the main throttle valve pressure line 192. When pressure is developed in the parts supplied by the line 192, the result thereof is introduced through the restriction 194 into the bore of the body to act on the left end of the land 188, and, as this pressure increases, it moves the metering part 185 to the right, first closing the port connected to line 191 and next establishing a connection from branch line 195 to exhaust through the bore of the valve at the exhaust port 196. As the part 182 is moved further to the left, a greater developed pressure is required in the line 192 to cause the metering valve part to move to the exhaust position and hence throttle valve pressure, or TV pressure as it will be sometimes called hereinafter, increases as the throttle is opened. This action is well known.

Trimmer valve

The valve body is provided with a bore for the valve indicated generally at 800. Within the bore is mounted a valve member 802 having spaced lands 804 and 806 of equal diameters. The lower end of the bore is closed by a plug 808 held in place by a pin 810. The valve is biased downward normally by a spring 812 surrounding the stem 814. Various ports for this valve are provided for connection to lines for operation to be described later.

In operation, when shift valve 56 is upshifted as previously described, oil being provided by supply line 48 through the shift valve 56 and line 442 to the line 390 continues therefrom to the line 381 leading to the accumulator 382. The clutch 26 is engaged at a rate depending on the pressure exerted thereon by the accumulator 382. Throttle valve pressure is fed through line 461 to the trimmer valve 800, this valve being biased downward normally permits oil to pass through the bore thereof between the lands 804 and 806 into the line 820 which extends to the accumulator 382. The trimmer valve acts to limit the pressure which can be supplied through the line 820 to the accumulator. Consequently, the spring 812 is preloaded to exert a downward force on the valve 802 great enough to require a predetermined force provided by the branch line 822 supplying oil to act on the lower end of the land 806. For example, but without limiting the invention, it may be assumed that the spring 812 is so preloaded that a pressure of 70 p. s. i. is required on the lower end of the land 806 to raise the valve 802. When the pressure in the line 820 exceeds the preloading of spring 812 the land 806 and consequently the entire valve 802 are lifted upwardly partially closing the port connected to line 820. Any pressure in line 820 in excess of the preloading will cause the valve 802 to be lifted high enough to permit land 806 to open the exhaust port 824. Thus, this valve serves to limit the pressure delivered to the accumulator to the maximum determined by the preloading of spring 812 so that for any throttle position causing the development of a higher pressure, this higher pressure will not be transmitted to the accumulator.

Inasmuch as the supply of pump pressure through line 381 to the accumulator is, in effect, in parallel to the line 390 and to the clutch 26, full line pressure will not be developed at clutch 26 until the accumulator has been filled to the full permissible extent determined by the biasing of the springs 385 and 386 and the oil pressure on the outer area of piston 384 which pressure corresponds to throttle valve pressure below a predetermined maximum. If an upshift occurs with the throttle at an intermediate position with a consequent intermediate throttle valve pressure, it follows that more oil can be fed into the lower end of the accumulator 382 to raise the piston 384 than would be the situation if the shift should be made at an advanced throttle position with consequent high throttle valve pressure. In other words, if the torque demand is low the clutch 26 has its rate of engagement retarded while if the torque demand is high the rate of engagement is accelerated. The trimmer valve just described is claimed in the copending application of John J. O'Malley, S. N. 534,328, filed September 14, 1955, for Accumulator Controls For Automatic Transmissions.

Figure 2:
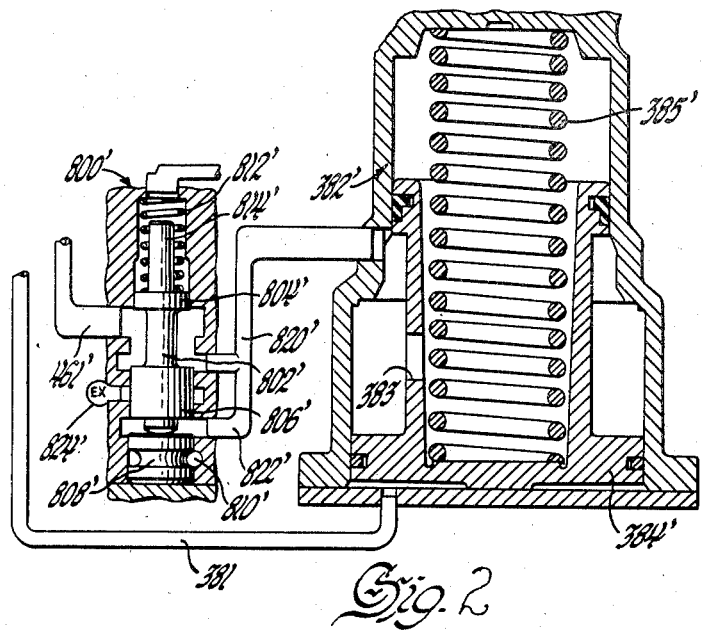
Figure 2 is a schematic representation of a modified form of the invention.

In Figure 2 a modified trimmer valve and accumulator arrangement constituting the present invention has been illustrated. In this modification the accumulator 382' has a piston 384' but the entire inner surface of the piston is to be subjected to modulated throttle valve pressure by providing an opening 383 in the skirt of the piston. Instead of dual springs a single spring 385' may be used. The trimmer valve 800' has a valve part 802' and spaced lands 804' and 806'. Land 806', however, is larger in diameter than land 804'. The other parts of the valve and piping connected thereto have the same reference characters as that shown in Figure 1 with the addition of a prime (') to each character.

Oil supplied by line 461', i. e., oil under throttle valve pressure can pass through the bore of the valve 802' between lands 804' and 806' to continue through the line 820' into the accumulator and to act on substantially the entire upper area of piston 384'. The spring 812' is preloaded to a lower effective pressure than the springs in the Figure 1 embodiment so that initially true throttle valve pressure will continue through the trimmer valve into the accumulator. When the pressure in line 820' and in the accumulator and also supplied to the lower end of land 806' by branch 822' exerts a pressure on the lower end of land 806' greater than the preloading of spring 812', the valve will be lifted closing the port connected to line 820'. From this condition as the throttle valve pressure increases the trimmer valve acts to modulate such throttle valve pressure due to the differential areas of the lands 804' and 806' which are subject to pressure from the line 461'. The valve 802' therefore serves to regulate or modulate throttle valve pressure with this modulated pressure increasing progressively with throttle valve pressure increase but at a different rate and with an entirely different and lower maximum. The action of the valve in this regulating operation can cause closing of the port connected to line 820' when a state of balanced pressure between the pressure in the accumulator and supplied throttle valve pressure is reached with an opening of the port connected to line 820' whenever the throttle valve pressure increases. In a similar fashion, assuming that the port connected to line 820' is closed and throttle valve pressure decreases in line 461', this accumulator pressure will lift the valve high enough for land 806' to permit some of the oil in the accumulator to be exhausted at the port 824'.

Figure 3:
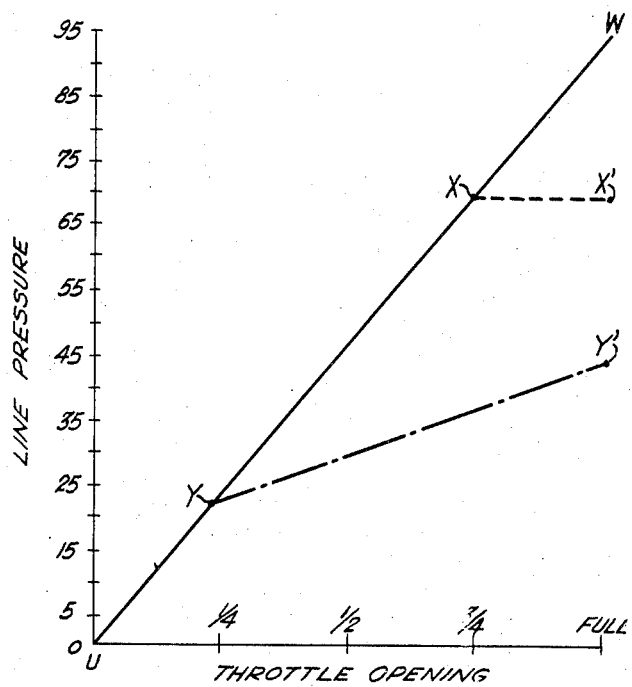
Figure 3 is a chart illustrating the effect of the trimmer valve of the pressure applied to the accumulator.

The difference in action between the valves of Figure 1 and Figure 2 will be evident from the chart of Figure 3. Assuming that the regulated pump pressure in the system is 95 p. s. i., the throttle valve operates to develop pressure along the line UW which increases with throttle opening from zero to maximum line pressure. With the trimmer valve 800 of Figure 1 the pressure supplied therethrough to the accumulator 382 is the same as throttle valve pressure from the point U to the point X. If the preloading of the spring 812 is such as to require 70 p. s. i. to overcome the spring, it follows then that when a throttle valve pressure of 70 p. s. i. is reached the pressure delivered to the accumulator for wider throttle opening and higher throttle valve pressure will not exceed the 70 p. s. i. or will continue along the dotted line XX'. However, with the Figure 2 modification, throttle valve pressure supplied to the valve 800' and through this valve to the accumulator 382' will be equal to throttle valve pressure until the preloading of spring 812' is overcome. Assuming that this preloading requires a pressure of 22 p. s. i. on the lower end of land 806', it follows that from the point Y on the throttle valve curve the supply to the accumulator will be modulated along the line YY' for further increases in throttle valve pressure. It will be seen from this chart that maximum throttle valve pressure equal to line pressure, i. e., 95 p. s. i., will be modulated for delivery to the accumulator along the line YY' to a maximum of, for example, 42 p. s. i. It is to be understood that these figures are merely examples of certain calibrations that have been successful in practice.

The invention is to be limited only by the following claims:

1. In a transmission for a throttle controlled engine, a gear train, a hydraulically actuated friction engaging device for conditioning said gear train for the transmission of torque therethrough, a source of fluid under pressure, a throttle valve regulating pressure from said source in accordance with engine throttle position, an accumulator, means for simultaneously supplying fluid from said source to said accumulator and to said friction engaging device to apply said device, means for supplying pressure from said throttle valve to said accumulator to oppose the pressure from said source, a trimmer valve between said throttle valve and said accumulator, said trimmer valve being so biased as to pass fluid from said throttle valve to said accumulator at throttle valve pressure over an initial range of throttle valve pressure, and means causing said trimmer valve to modulate throttle valve pressure over the remaining range of throttle valve pressure.

2. In a transmission for a throttle controlled engine, a gear train, a hydraulically actuated friction engaging device for conditioning said gear train for the transmission of torque therethrough, a source of fluid under pressure, a throttle valve regulating pressure from said source in accordance with engine throttle position, an accumulator having a piston spring biased in one direction, means for simultaneously supplying fluid from said source to said accumulator to oppose said spring biasing and to said friction engaging device to apply said device, means for supplying pressure from said throttle valve to said accumulator to oppose the pressure from said source, and a trimmer valve between said throttle valve and said accumulator, said trimmer valve being spring biased in one direction and having unbalanced areas subject to fluid pressure cooperating with said spring biasing to cause said trimmer valve to pass fluid from said throttle valve to said accumulator at throttle valve pressure over an initial range of throttle valve pressure and to modulate throttle valve pressure over the remaining range of throttle valve pressure.

3. In a transmission for a throttle controlled engine, a gear train, a hydraulically actuated friction engaging device for conditioning said gear train for the transmission of torque therethrough, a source of fluid under pressure, a throttle valve regulating pressure from said source in accordance with engine throttle position, an accumulator having a piston spring biased in one direction, means for simultaneously supplying fluid from said source to said accumulator to oppose said spring biasing and to said friction engaging device to apply said device, means for supplying pressure from said throttle valve to substantially the entire area of one side of the piston of said accumulator to oppose the pressure from said source, and a trimmer valve between said throttle valve and said accumulator for limiting the pressure from said throttle valve to a maximum lower than maximum throttle valve pressure.

4. In a transmission for a throttle controlled engine, a gear train, a hydraulically actuated friction engaging device for conditioning said gear train for the transmission of torque therethrough, a source of fluid under pressure, a throttle valve regulating pressure from said source in accordance with engine throttle position, an accumulator having a piston spring biased in one direction, means for simultaneously supplying fluid from said source to said accumulator to oppose said spring biasing and to said friction engaging device to apply said device, means for supplying pressure from said throttle valve to substantially the entire area of one side of the piston of said accumulator to oppose the pressure from said source, and a trimmer valve between said throttle valve and said accumulator, said trimmer valve passing fluid from said throttle valve to said accumulator at throttle valve pressure over an initial range of throttle valve pressure increase and modulating the pressure of fluid from said throttle valve in accordance with throttle valve pressure increase over the remaining range of throttle valve pressure increase.

5. In a transmission for a throttle controlled engine, a gear train, a hydraulically actuated friction engaging device for conditioning said gear train for the transmission of torque therethrough, a source of fluid under pressure, a throttle valve regulating pressure from said source in accordance with engine throttle position, an accumulator, means for simultaneously supplying fluid from said source to said accumulator and to said friction engaging device to apply said device, means for supplying pressure from said throttle valve to said accumulator to oppose the pressure from said source, and a trimmer valve between said throttle valve and said accumulator, said trimmer valve passing fluid from said throttle valve to said accumulator at throttle valve pressure over an initial range of throttle valve pressure and modulating throttle valve pressure over the remaining range of throttle valve pressure, said trimmer valve being spring biased in one direction and having differential areas subject to the pressure supplied to said accumulator to oppose pressure from said source.

6. In a transmission for a throttle controlled engine, a gear train, a hydraulically actuated friction engaging device for conditioning said gear train for the transmission of torque therethrough, a source of fluid under pressure, a throttle valve regulating pressure from said source in accordance with engine throttle position, an accumulator having a piston spring biased in one direction, means for simultaneously supplying fluid from said source to said accumulator to oppose said spring biasing and to said friction engaging device to apply said device, means for supplying pressure from said throttle valve to said accumulator to oppose the pressure from said source, and a trimmer valve between said throttle valve and said accumulator, said trimmer valve passing fluid from said throttle to said accumulator at throttle valve pressure over an initial range of throttle valve pressure and modulating throttle valve pressure over the remaining range of throttle valve pressure, said trimmer valve being spring biased in one direction and having differential areas subject to the pressure supplied to said accumulator to oppose pressure from said source.

7. In a transmission for a throttle controlled engine, a gear train, a hydraulically actuated friction engaging device for conditioning said gear train for the transmission of torque therethrough, a source of fluid under pressure, a throttle valve regulating pressure from said source in accordance with engine throttle position, an accumulator having a piston spring biased in one direction, means for simultaneously supplying fluid from said source to said accumulator to oppose said spring biasing and to said friction engaging device to apply said device, means for supplying pressure from said throttle valve to substantially the entire area of one side of the piston of said accumulator to oppose the pressure from said source, and a trimmer valve between said throttle valve and said accumulator for limiting the pressure from said throttle valve to a maximum lower than maximum throttle valve pressure, said trimmer valve being spring biased in one direction and having differential areas subject to the pressure supplied to said accumulator to oppose pressure from said source.

8. In a transmission for a throttle controlled engine, a gear train, a hydraulically actuated friction engaging device for conditioning said gear train for the transmission of torque therethrough, a source of fluid under pressure, a throttle valve regulating pressure from said source in accordance with engine throttle position, an accumulator having a piston spring biased in one direction, means for simultaneously supplying fluid from said source to said accumulator to oppose said spring biasing and to said friction engaging device to apply said device, means for supplying pressure from said throttle valve to substantially the entire area of one side of the piston of said accumulator to oppose the pressure from said source, and a trimmer valve between said throttle valve and said accumulator, said trimmer valve passing fluid from said throttle valve to said accumulator at throttle valve pressure over an initial range of throttle valve pressure increase and modulating the pressure of fluid from said throttle valve in accordance with throttle valve pressure increase over the remaining range of throttle valve pressure increase, said trimmer valve being spring biased in one direction and having differential areas subject to the pressure supplied to said accumulator to oppose pressure from said source.

No references cited.